(12) United States Patent
Krishnamurthy et al.

(10) Patent No.: US 8,059,712 B2
(45) Date of Patent: Nov. 15, 2011

(54) INDEPENDENTLY ADJUSTING THE QUALITY LEVELS FOR LUMINANCE AND CHROMINANCE CHANNELS IN A DIGITAL IMAGE

(75) Inventors: Balaji Krishnamurthy, Delhi (IN); Anubha Rastogi, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1566 days.

(21) Appl. No.: 11/445,635

(22) Filed: Jun. 2, 2006

(65) Prior Publication Data
US 2007/0165725 A1 Jul. 19, 2007

(51) Int. Cl.
*H04N 7/12* (2006.01)

(52) U.S. Cl. ......... 375/240.02; 375/240.03; 375/240.04; 375/240.05; 375/240.06

(58) Field of Classification Search . 375/240.02–240.06
See application file for complete search history.

(56) References Cited

U.S. PATENT DOCUMENTS

| | | | |
|---|---|---|---|
| 5,247,589 A | 9/1993 | Faul | |
| 5,293,252 A | 3/1994 | Kim et al. | |
| 5,359,842 A | 11/1994 | Braxmeier et al. | |
| 5,398,066 A | 3/1995 | Martinez-Uriegas et al. | |
| 5,539,842 A | 7/1996 | Schwartz | |
| 5,541,653 A | 7/1996 | Peters et al. | |
| 5,748,242 A | 5/1998 | Podilchuk | |
| 6,067,120 A | 5/2000 | Horikawa et al. | |
| 6,256,347 B1 | 7/2001 | Yu et al. | |
| 6,314,136 B1 | 11/2001 | Kilgariff | |
| 6,360,022 B1 | 3/2002 | Lubin et al. | |
| 6,650,773 B1 | 11/2003 | Maurer et al. | |
| 6,825,876 B1 | 11/2004 | Easwar et al. | |
| 7,308,146 B2 | 12/2007 | Becker et al. | |
| 7,463,775 B1 | 12/2008 | Sites | |
| 2002/0061063 A1 | 5/2002 | Otto | |
| 2003/0142864 A1 | 7/2003 | Bezryadin | |
| 2003/0202713 A1 | 10/2003 | Sowa | |
| 2003/0235339 A1 | 12/2003 | Shin | |
| 2004/0131264 A1 | 7/2004 | Sakuyama et al. | |
| 2005/0117807 A1 | 6/2005 | Shohdohji | |
| 2005/0226513 A1 | 10/2005 | Wallace et al. | |
| 2005/0249405 A1 | 11/2005 | Bezryadin | |
| 2005/0249406 A1 | 11/2005 | Bezryadin | |

OTHER PUBLICATIONS

Roimela, Aarnio and Itatanta, "High Dynamic Range Texture Compression," Nokia Research Center. Xu, R., Parranaik, S.N., and Hughes, C.E., "High Dynamic Range Still-Image Encoding in JPEG2000," IEEE Computer Graphics and Applications, vol. 25, Issue 6, pp. 57-64.
Office Action from U.S. Appl. No. 11/248,878, mailed Jan. 27, 2009.

*Primary Examiner* — Jayanti K Patel
*Assistant Examiner* — Geepy Pe
(74) *Attorney, Agent, or Firm* — Robert C. Kowert; Meyertons, Hood, Kivlin, Kowert & Goetzel, P.C.

(57) ABSTRACT

A system that compresses a digital image. During operation, the system obtains a digital image in which the image components are de-correlated into separate channels containing luminance information and chrominance information. Next, the system receives a quality number for the luminance channel and a quality number for the chrominance channels, and uses the quality numbers to determine a target bitrate for the luminance channel and for the chrominance channels, respectively. Given the target bitrate for the luminance channel and the target bit rate for the chrominance channels, the system performs rate distortion optimizations separately on the luminance and chrominance channels to determine which portions of the luminance bitstream and which portions of the chrominance bitstream are to be included in the final bitstream. The system then uses the stored rate-distortion information to generate a preview of the digital image without performing entropy coding each time the quality settings are changed.

19 Claims, 2 Drawing Sheets

INDEPENDENTLY ADJUSTING THE QUALITY LEVELS FOR LUMINANCE AND CHROMINANCE CHANNELS IN A DIGITAL IMAGE

RELATED APPLICATION

This application hereby claims priority under 35 U.S.C. §119 and/or 365 to Indian Patent Application No. 104/DEL/2006, filed on 13 Jan. 2006, entitled "Independently Adjusting the Quality Levels for Luminance in a Digital Image", by inventors Balaji Krishnamurthy and Anubha Rastogi.

FIELD OF THE INVENTION

The present invention relates to techniques for compressing digital images. More specifically, the present invention relates to a method and an apparatus that facilitates independently adjusting the quality levels for luminance and chrominance channels in a digital image.

RELATED ART

In recent years, the use of high-resolution digital cameras has increased significantly. Unfortunately, storing raw high-resolution digital images requires large amounts of memory. For example, a 4 mega-pixel digital camera requires up to 12 MB of memory to store a raw digital image. However, in most applications, not all of the information in a raw digital image is required. Furthermore, despite the wide-spread adoption of broadband internet connections, transmitting a large digital image still requires a substantial amount of time. Hence, a technique to reduce the size of a digital image is needed.

One technique for reducing the size of a digital image is to use a lossy image compression technique such as JPEG2000. Unfortunately, such lossy compression techniques typically sacrifice some amount of image quality. Consequently, the task of determining what constitutes an acceptable amount of compression loss in a color digital image involves considerable subjectivity. Objective measures such as Mean Square Error (MSE), Peak Signal to Noise Ratio (PSNR), and Perceptual Distortion Metrics do not adequately express the perceived degradation in image quality caused by lossy compression techniques. In these situations, it is desirable for lossy compression systems to allow the user to control the compression process and to preview the compressed image.

Under JPEG2000 compression, a "target bitrate" is typically used to control the compression process. To this end, a Post-Compression Rate-Distortion (PCRD) technique is often used to produce a bitstream of the desired size with the least possible distortion for the given target bitrate. A number of distortion measures can be used, such as MSE, or a weighted MSE, which takes perceptual distortion into account. Typically the weights used in such perceptual distortion metrics are hard-coded inside an image-processing program and are not available for the user to manipulate. Even if such weights could be controlled by the user, the controls would be rather complicated and non-intuitive to use.

Hence, what is needed is a method and an apparatus for controlling image quality when compressing a digital image without the above-described problems.

SUMMARY

One embodiment of the present invention provides a system that compresses a digital image. During operation, the system obtains a digital image in which the image components are de-correlated into separate channels containing luminance information and chrominance information. Next, the system receives a quality number for the luminance channel and a quality number for the chrominance channels. (Note that the system receives the quality number for the luminance channel and chrominance channels from a user.) The system then uses the quality number for the luminance channel to determine a target bitrate for the luminance channel, and uses the quality number for the chrominance channels to determine a target bitrate for the chrominance channels. Given the target bitrate for the luminance channel and the target bit rate for the chrominance channels, the system performs rate-distortion optimizations separately on the luminance and chrominance channels to determine which portions of the luminance bitstream and which portions of the chrominance bitstream are to be included in the final bitstream.

In a variation on this embodiment, prior to performing the rate-distortion optimizations, the system performs a discrete wavelet transform separately on the luminance channel and the chrominance channels. Next, the system quantizes the discrete wavelet transform coefficients using small-valued quantizers. The system then partitions the digital image into small code blocks and applies entropy coding to each code block to generate bitstreams for the luminance channel and the chrominance channels.

In a variation on this embodiment, while applying entropy coding to each code block, the system generates information about the compressed length and the distortion for each pass of the embedded block coding with optimal truncation for each code block. The system then stores rate-distortion information specifying the compressed length and distortion for each code block into a table.

In a variation on this embodiment, while determining which parts of the luminance bitstream and which parts of the chrominance bit streams are to be included in the final bitstream, the system applies the rate-distortion optimization to the luminance channel and the chrominance channels separately using the stored rate-distortion information.

In a variation on this embodiment, the system generates a preview of the digitized image as follows. The system uses the stored rate-distortion information to select bitplanes to include in the digital image. Next, the system removes unneeded bit planes for each code block. The system then performs an inverse wavelet transform on the processed digital image. Next, the system performs an inverse de-correlating transform and displays the compressed digital image. The system then reports an accurate prediction of the compressed file size. Note that entropy coding is not performed each time the quality settings are changed. This substantially reduces the amount of time required to create a preview of the image for a given quality setting. After a user determines that the selected quality setting is satisfactory, the compressed data for the digital image is saved.

In a variation on this embodiment, if a low resolution preview is desired, the bitplanes for only those sub-bands that correspond to the desired resolution are discarded, and the inverse wavelet transform is performed only to the desired resolution-level.

In a variation on this embodiment, the system generates a preview of the luminance channel only by using the stored rate-distortion information of the luminance channel for the received luminance quality number to determine which bitplanes of the luminance channel to discard. Next, the system discards the unneeded bitplanes from each code block of the luminance channel. The system then de-quantizes the processed digital image, performs an inverse wavelet transform on the de-quantized digital image, and displays the preview of the digital image containing only the luminance channel information.

In a variation on this embodiment, the quality numbers for the luminance and chrominance channels are mapped to fractions of a maximum raw bit stream size of the respective channel.

In a variation on this embodiment, the luminance and the chrominance quality numbers for a given region of the digital image can be set independently of the luminance and the chrominance quality numbers for other regions of the digital image.

In a variation on this embodiment, the system uses the quality number for the luminance channel to determine a target bitrate for the luminance channel corresponding to a given region of the digital image. Next, the system uses the quality number for the chrominance channels to determine a target bitrate for the chrominance channels corresponding to the given region of the digital image. The system then performs rate distortion optimization on the luminance channel and the chrominance channels corresponding to the given region to determine which parts of the luminance channel and which parts of the chrominance channel corresponding to the given region are to be included in the final bitstream.

In a variation on this embodiment, the quality numbers for the luminance and the chrominance channels for the given region of the digital image are mapped to fractions of the maximum bitstream size of the respective channels corresponding to the given region.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 2:
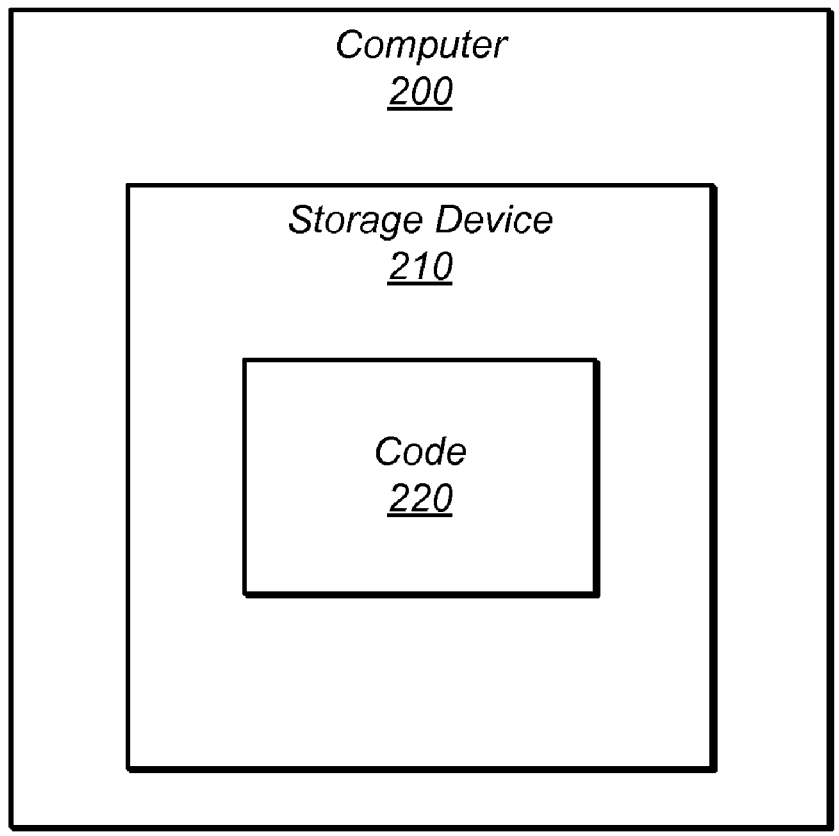
FIG. 2. presents a block diagram showing a device or non-transitory computer-readable storage medium storing code for compressing a digital image.

As shown in FIG. 2, the data structures and code 220 described in this detailed description are typically stored on a computer-readable storage medium, which may be any device or medium 230 that can store code and/or data for use by a computer system 200. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Quality Numbers for Luminance and Chrominance Channels

The present invention provides a mechanism to separately vary the bitrate allocated to the luminance channel (image features) and the chrominance channels (color information) of a compressed digital image. This mechanism can be coupled with a preview mechanism so that a user can subjectively determine which settings produce the best possible image for a given bit-budget.

Given a target bitrate, the PCRD technique is used to minimize the overall distortion for all the channels for the given bitrate. For low bitrates, the PCRD technique can produce fuzzy looking color images. A user may want to trade off some color information for more image sharpness or vice-versa. Even at medium and high bitrates the user may want more or less features in lieu of color information so that the subjective perception of image quality is improved. The present invention enables the user to make these tradeoffs to improve the perceived image quality.

Note that in case of a single component image (grayscale, for example), the MSE metric (or a weighted MSE metric) is a reasonable indicator of image quality. Also note that most of the images compressed in JPEG2000 undergo a de-correlating transform which separates the luminance information (image features) from the chrominance (color) information. Furthermore, note that the human eye is generally more sensitive to luminance information than chrominance information within an image.

"Quality numbers" for the luminance channel and the chrominance channels correspond to fractions of the maximum possible raw bitstream size of the respective channels. These quality numbers can be set independently for the luminance and chrominance channels. The PCRD technique is then applied to the luminance channel and the chrominance channels separately. The information output by the PCRD technique is used to provide a preview of the digital image.

In one embodiment of the present invention, a separate preview of the luminance information is provided so that the user can determine the acceptable amount of image-feature loss. In this way, the user can first select a luminance quality number with the assistance of the luminance preview mechanism, and can then switch to the full image preview mechanism to select the chrominance quality number to add just enough color information to make the overall image quality acceptable.

In one embodiment of the present invention, the system uses a standard PCRD technique to minimize MSE for all channels. The user then fine tunes the amount of luminosity and color information using the quality numbers and the preview mechanism.

In one embodiment of the present invention, the quality numbers are fractions of the total bitstream size for the channels. These quality numbers provide the user with the ability to control the proportions of luminance information and chrominance information in the final bitstream. A separate luminance preview mechanism and a full image preview mechanism aid in selecting the proper quality numbers for the luminance channel and the chrominance channels, respectively.

In cases where the PCRD technique is not performed and scalar quantization is used to control compression quality, the user can select the quantizers for the luminance channel and chrominance channels separately, making use of the luminance preview and the full image preview.

Note that in cases where PCRD is not performed, the file size of the compressed image cannot be predicted, but the preview of the image is still accurate (for example, when PCRD is not performed and scalar quantization is used instead).

Generating a Preview of a Digital Image

The present invention provides a fast and accurate preview mechanism which facilitates fine control of the visual quality. This preview mechanism also accurately reports the final compressed file size for given quality numbers for the luminance channel and the chrominance channels.

Note that in order to generate an accurate preview and to provide the user the exact compressed file size, a typical technique is to compress and decompress the digital image. Unfortunately, this compression-decompression process is extremely slow. Note that the present invention does not perform decompression or compression when generating such previews and compressed file sizes.

Figure 1:
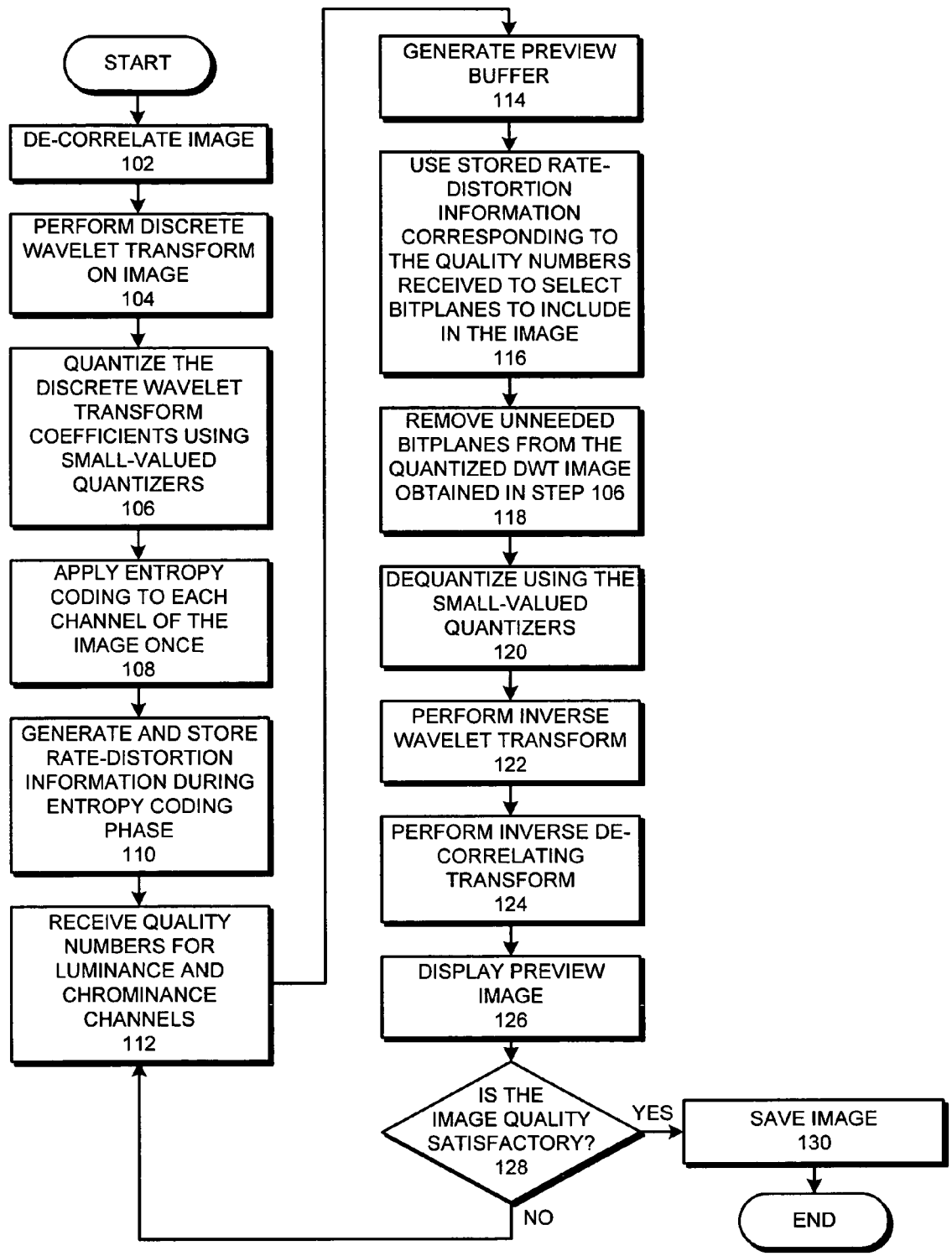
FIG. 1 presents a flow chart illustrating the process of generating a preview of a digital image in accordance with an embodiment of the present invention.

FIG. 1 presents a flow chart illustrating the process of generating a preview of a digital image in accordance with an embodiment of the present invention. If the digital image is in a color-space that requires de-correlation to achieve efficient compression (for example an RGB image), the system first applies a de-correlating transform to the digital image and the digital image is converted to a luminance-chrominance color-space (step 102). For example, the three component transform specified in the JPEG2000 standard coverts an image in an R-G-B color-space to an image in a Y-Cb-Cr color-space. The Y channel in the Y-Cb-Cr color-space corresponds to the luminosity and carries the most perceptual information of all channels in the Y-Cb-Cr color-space. The Cb and Cr channels contain the chrominance (color) information and hence carry less significant perceptual information. Note that if the image is in a color-space that is already de-correlated, for example LAB or SYCC color-spaces, the de-correlating transform does not have to be applied and the luminance channel and the chrominance channels can be used directly.

Next, the system performs a discrete wavelet transform (DWT) on the luminance channel and the chrominance channels (step 104). The DWT decomposes the digital image into wavelet-transform coefficients. These coefficients are typically grouped into individual sub-bands depending upon the frequency and the spatial orientation of the coefficients.

The system then quantizes the coefficients of the discrete wavelet transform using small-valued quantizers (step 106), thus preserving the maximum amount of information about the image. Also note that the system partitions the digital image into small rectangular code blocks prior to entropy coding.

Next, the system applies the JPEG2000 entropy coding technique once to produce a bit stream $B_{max}$, of total length $S_{max}$ (step 108). Note that the quantizers are chosen so that the loss in image quality is minimal. Also note that decoding this bitstream results in a very high quality digital image. Furthermore, the system assigns a positive integer $Q_{max}$ to represent the quality number corresponding to $B_{max}$. Moreover, if sufficient memory is available, the DWT coefficients are stored.

During the encoding process, the system generates information about the compressed length and the distortion for each Embedded Block Coding with Optimal Truncation (EBCOT) pass for each code block and stores this information in a structure called RDHull (step 110). Note that step 110 is performed only once and is not repeated each time the quality number is changed.

Note that the luminance contribution of $B_{max}$ is $B_{lum}$ with length $S_{lum}$, and the chrominance contribution is $B_{chr}$ with length $S_{chr}$. The maximum quality numbers for the luminance and chrominance channels are the positive numbers $Q_{lum}$ and $Q_{chr}$, respectively.

Quality numbers for the luminance channel are defined such that quality number $0<ql\leq Q_{lum}$ corresponds to a rate-distortion optimized bitstream of length $Tql=(ql/Q_{lum})*S_{lum}$. Similarly for the chrominance channels, quality numbers are defined such that quality number $0<qc\leq Q_{chr}$ corresponds to a rate-distortion optimized bit stream of length $Tqc=(qc/Q_{chr})*S_{chr}$.

The process in FIG. 1 continues when the system receives a quality number pair (ql, qc) and supplies the target bitrates (Tql, Tqc) to the PCRD optimizer (step 112).

Next a preview buffer is created (step 114) in the following way: If the quantized DWT coefficients from step 106 have been stored, the system creates a copy of the stored coefficients. Otherwise, the system performs the DWT and quantization as per step 106.

The PCRD optimizer then performs rate-distortion optimization separately on the luminance channel and the chrominance channels using the stored rate-distortion information to determine which parts of the encoded luminance bitstream ($B_{lum}$) and which parts of the encoded chrominance bitstream ($B_{chr}$) need to be included in the final bit stream (step 116). This optimization process determines which EBCOT passes, and hence which bitplanes, are to be included for each code block. Next, the system discards the unneeded bitplanes of each code block from the preview buffer generated in step 114 (step 118).

Note that each bitplane gives rise to a fixed number of EBCOT passes: one pass if it is the first bitplane, and three passes for other bitplanes.

Next, the system de-quantizes the image using the small-valued quantizers used in step 106 (step 120). The system then performs an inverse wavelet transform on the image (step 122), followed by an inverse de-correlating transform (step 124). Note that the inverse de-correlating transform is needed when processing a digital image which was originally in a correlated color-space. In one embodiment of the present invention, the preview generation process generates a preview of the luminosity channel only.

The system then displays the preview of the digital image for the selected quality number (step 126). If the image quality is satisfactory (step 128), the system saves the image (step 130). Otherwise, the process returns to step 112.

Note that the system determines the size L_(ql, qc) of the bit stream corresponding to the quality pair (ql, qc) using the length information for each coding pass stored in the RDHull structure generated during PCRD optimization. Since the discrete wavelet transform, entropy coding, and entropy decoding are decoupled from the preview generation process, each time the user selects a quality value pair, the system performs only the DWT, the PCRD optimization, and the inverse wavelet transform. If the DWT coefficients are stored, the DWT step is not needed. Note that entropy coding/decoding is completely eliminated from the preview-generation process and instant feedback on the image size and image compression losses are provided.

In one embodiment of the present invention, sliders in a user interface can be used to select the quality numbers for the luminance channel and the chrominance channels. These sliders allow the user to intuitively control the bitrates of the luminance channel and the chrominance channels, and to subjectively generate the best possible compressed image for a given bit-budget.

In cases where PCRD is not performed and scalar quantization is used to control compression quality, the system maps the quality numbers ql and qc to appropriate sets of quantizers of the wavelet sub-bands and allows the user to select the quantizers for the luminance channel and the chrominance channels separately.

Note that in cases where PCRD is not performed, the file size of the compressed image cannot be predicted, but the preview of the image is still accurate (for example, when PCRD is not performed and scalar quantization is used instead).

In this case, the preview generation process operates as follows. The luminance channel is first subjected to a discrete wavelet transform, and is quantized using the selected quantizer. Next, the result is de-quantized before being displayed. For the full image preview, all of the channels are subjected to this process and an inverse de-correlating transform is applied (if necessary) to generate the preview image.

In one embodiment of the present invention, the above-described image-compression technique is used to compress individual video frames. Since the file size is fixed, the user only needs to adjust the quality. Note that the quality settings can be reused for a range of frames.

In one embodiment of the present invention, a preview of the luminance channel only is generated by using the stored rate-distortion information of the luminance channel for the received luminance quality number to determine which bit-planes of the luminance channel to discard. Next, the unneeded bitplanes are discarded from each code block of the luminance channel. The processed digital image is then de-quantized, an inverse wavelet transform is performed on the de-quantized digital image, and the preview of the digital image containing only the luminance channel information is displayed.

In one embodiment of the present invention, if a low resolution preview is desired, the system determines which bit-planes to discard for only those sub-bands that correspond to the desired resolution. Note that code blocks belonging to sub-bands that do not contribute to the desired resolution are discarded. Also note that the system performs the inverse wavelet transform only to the desired resolution-level. Also note that this is true both when using PCRD and when using scalar quantization.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for compressing a digital image, comprising:
performing by a computer:
   obtaining the digital image in a de-correlated color space comprising separate channels, including a luminance channel and chrominance channels;
   compressing the digital image into a bit stream, wherein the bit stream comprises:
      a compression of the luminance channel into a luminance bit stream; and
      a compression of the chrominance channels into a chrominance bit stream;
   mapping a received quality number for the luminance channel to a target bit rate for the luminance channel that is a fraction of the length of the luminance bit stream;
   mapping a received quality number for the chrominance channels to a target bit rate for the chrominance channels that is a fraction of the length of the chrominance bit stream; and
   supplying both the target bit rate for the luminance channel and the target bit rate for the chrominance channels to a rate distortion optimizer which performs a rate-distortion optimization separately on the luminance and chrominance channels of the bit stream to determine which portions of the luminance bit stream to include in compressing the luminance bit stream into a rate-distortion optimized luminance bit stream whose length does not exceed the target bit rate for the luminance channel and which portions of the chrominance bit stream to include in compressing the chrominance bit stream into a rate-distortion optimized chrominance bit stream whose length does not exceed the target bit rate for the chrominance channels.

2. The method of claim 1, wherein said compressing the digital image into a bit stream comprises:
   performing a discrete wavelet transform separately on the luminance channel and the chrominance channels to decompose the digital image into discrete wavelet transform coefficients;
   quantizing the discrete wavelet transform coefficients for the luminance and chrominance channels using small-valued quantizers;
   partitioning the digital image into small code blocks; and
   applying entropy coding to each of the small code blocks to compress each of the small code blocks into a code block bit stream for the luminance channel and a code block bit stream for the chrominance channels.

3. The method of claim 2, wherein said applying the entropy coding to each of the small code blocks comprises, for each of the small code blocks: generating and storing rate-distortion information comprising the compressed code block bit stream length and distortion information for each pass of the entropy coding.

4. The method of claim 3, wherein said determining which portions of the luminance bit stream to include in compressing the luminance bit stream into the rate-distortion optimized luminance bit stream and which portions of the chrominance bit stream to include in compressing the chrominance bit stream into the rate-distortion optimized chrominance bit stream via said performing the rate-distortion optimization separately on the luminance and chrominance channels is based on the stored rate-distortion information and determines which passes of the entropy coding to include in said compressing the luminance bit stream and in said compressing the chrominance bit stream.

5. The method of claim 4, further comprising:
   generating a preview of the digital image based on the stored rate-distortion information, wherein said generating the preview comprises:
      selecting which bit planes to include in said generating the preview of the digital image, wherein said selecting is based on the passes of the entropy coding determined for inclusion in said compressing the luminance bit stream and in said compressing the chrominance bit stream;
      removing from the quantized discrete wavelet transform coefficients for the luminance and chrominance channels bit planes not selected by said selecting, wherein said removing is performed for each of the small code blocks;
      de-quantizing the discrete wavelet transform coefficients for the luminance and chrominance channels subsequent to said removing;
      performing an inverse wavelet transform on the de-quantized discrete wavelet transform coefficients for the luminance and chrominance channels;
      performing an inverse de-correlating transform on the result of said performing the inverse wavelet transform to obtain the preview of the digital image; and displaying the preview of the digital image;
wherein the entropy coding is not performed again after said compressing the digital image into a bit stream.

6. The method of claim 5, wherein:
said generating the preview comprises generating the preview in a desired low-resolution;
said selecting which bit planes to include in said generating the preview is performed for sub-bands of the discrete wavelet transform coefficients that correspond to the desired low-resolution preview; and
said performing the inverse wavelet transform is performed only to the desired low-resolution.

7. The method of claim 4, further comprising:
generating a separate preview of the luminance channel of the digital image based on the stored rate-distortion information for the luminance channel, wherein said generating the separate preview of the luminance channel of the digital image comprises:
determining which bit planes to discard from the quantized discrete wavelet transform coefficients for the luminance channel, wherein said determining is based on the passes of the entropy coding determined for inclusion in said compressing the luminance bit stream;
discarding the determined bit planes from the quantized discrete wavelet transform coefficients for the luminance channel for each code block for the luminance channel;
de-quantizing the quantized discrete wavelet transform coefficients for the luminance channel subsequent to said discarding;
performing an inverse wavelet transform on the de-quantized discrete wavelet transform coefficients for the luminance channel to obtain the separate preview of the luminance channel of the digital image; and
displaying the separate preview of the luminance channel of the digital image containing only luminance channel information.

8. The method of claim 1, wherein the digital image comprises a plurality of regions, and the method further comprises setting luminance and chrominance quality numbers for a given region of the plurality of regions of the digital image independently of luminance and chrominance quality numbers for others of the plurality of regions of the digital image.

9. The method of claim 8, further comprising:
for each given region of the plurality of regions of the digital image:
mapping the luminance quality number for the given region to a target bit rate for the luminance channel for the given region that is a fraction of the length of the portion of the luminance bit stream that corresponds to the given region of the digital image;
mapping the chrominance quality number for the given region to a target bit rate for the chrominance channels for the given region that is a fraction of the length of the portion of the chrominance bit stream that corresponds to the given region of the digital image; and
supplying both the target bit rate for the luminance channel for the given region and the target bit rate for the chrominance channels for the given region to the rate distortion optimizer, which performs a rate-distortion optimization separately on the luminance channel and the chrominance channels corresponding to the given region to:
determine which parts of the luminance bit stream corresponding to the given region to include in compressing the parts of the luminance bit stream corresponding to the given region into a rate-distortion optimized luminance bit stream for the given region whose length does not exceed the target bit rate for the luminance channel for the given region; and
determine which parts of the chrominance bit stream corresponding to the given region to include in compressing the parts of the chrominance bit stream corresponding to the given region into a rate-distortion optimized chrominance bit stream for the given region whose length does not exceed the target bit rate for the chrominance channels for the given region.

10. A non-transitory computer-readable storage medium storing instructions that when executed by a computer cause the computer to perform a method for compressing a digital image, the method comprising:
obtaining the digital image in a de-correlated color space comprising separate channels, including a luminance channel and chrominance channels;
compressing the digital image into a bit stream, wherein the bit stream comprises:
a compression of the luminance channel into a luminance bit stream; and
a compression of the chrominance channels into a chrominance bit stream;
mapping a received quality number for the luminance channel to a target bit rate for the luminance channel that is a fraction of the length of the luminance bit stream;
mapping a received quality number for the chrominance channels to a target bit rate for the chrominance channels that is a fraction of the length of the chrominance bit stream; and
supplying both the target bit rate for the luminance channel and the target bit rate for the chrominance channels to a rate distortion optimizer which performs a rate-distortion optimization separately on the luminance and chrominance channels of the bit stream to determine which portions of the luminance bit stream to include in compressing the luminance bit stream into a rate-distortion optimized luminance bit stream whose length does not exceed the target bit rate for the luminance channel and which portions of the chrominance bit stream to include in compressing the chrominance bit stream into a rate-distortion optimized chrominance bit stream whose length does not exceed the target bit rate for the chrominance channels.

11. The non-transitory computer-readable storage medium of claim 10, wherein said compressing the digital image into a bit stream comprises:
performing a discrete wavelet transform separately on the luminance channel and the chrominance channels to decompose the digital image into discrete wavelet transform coefficients;
quantizing the discrete wavelet transform coefficients for the luminance and chrominance channels using small-valued quantizers;
partitioning the digital image into small code blocks; and
applying entropy coding to each of the small code blocks to compress each of the small code blocks into a code block bit stream for the luminance channel and a code block bit stream for the chrominance channels.

12. The non-transitory computer-readable storage medium of claim 11, wherein said applying the entropy coding to each of the small code blocks comprises, for each of the small code blocks: generating and storing rate-distortion information comprising the compressed code block bit stream length and distortion information for each pass of the entropy.

13. The non-transitory computer-readable storage medium of claim 12, wherein said determining which portions of the luminance bit stream to include in compressing the luminance bit stream into the rate-distortion optimized luminance bit stream and which portions of the chrominance bit stream to include in compressing the chrominance bit stream into the rate-distortion optimized chrominance bit stream via said performing the rate-distortion optimization separately on the luminance and chrominance channels is based on the stored rate-distortion information and determines which passes of the entropy coding to include in said compressing the luminance bit stream and in said compressing the chrominance bit stream.

14. The non-transitory computer-readable storage medium of claim 13, the method further comprises:
    generating a preview of the digital image based on the stored rate-distortion information, wherein said generating the preview comprises:
        selecting which bit planes to include in said generating the preview of the digital image, wherein said selecting is based on the passes of the entropy coding determined for inclusion in said compressing the luminance bit stream and in said compressing the chrominance bit stream;
        removing from the quantized discrete wavelet transform coefficients for the luminance and chrominance channels bit planes not selected by said selecting, wherein said removing is performed for each of the small code blocks;
        de-quantizing the discrete wavelet transform coefficients for the luminance and chrominance channels subsequent to said removing;
        performing an inverse wavelet transform on the de-quantized discrete wavelet transform coefficients for the luminance and chrominance channels;
        performing an inverse de-correlating transform on the result of said performing the inverse wavelet transform to obtain the preview of the digital image; and
        displaying the preview of the digital image;
        wherein the entropy coding is not performed again after said compressing the digital image into a bit stream.

15. The non-transitory computer-readable storage medium of claim 14, wherein:
    said generating the preview comprises generating the preview in a desired low-resolution;
    said selecting which bit planes to include in said generating the preview is performed for sub-bands of the discrete wavelet transform coefficients that correspond to the desired low-resolution preview; and
    said performing the inverse wavelet transform is performed only to the desired low-resolution.

16. The non-transitory computer-readable storage medium of claim 13, wherein the method further comprises:
    generating a separate preview of the luminance channel of the digital image based on the stored rate-distortion information for the luminance channel, wherein said generating the separate preview of the luminance channel of the digital image comprises:
        determining which bit planes to discard from the quantized discrete wavelet transform coefficients for the luminance channel, wherein said determining is based on the passes of the entropy coding determined for inclusion in said compressing the luminance bit stream;
        discarding the determined bit planes from the quantized discrete wavelet transform coefficients for the luminance channel for each code block for the luminance channel;
        de-quantizing the quantized discrete wavelet transform coefficients for the luminance channel subsequent to said discarding;
        performing an inverse wavelet transform on the de-quantized discrete wavelet transform coefficients for the luminance channel to obtain the separate preview of the luminance channel of the digital image; and
        displaying the separate preview of the luminance channel of the digital image containing only luminance channel information.

17. The non-transitory computer-readable storage medium of claim 10, wherein the digital image comprises a plurality of regions, and the method further comprises setting luminance and chrominance quality numbers for a given region of the plurality of regions of the digital image independently of luminance and chrominance quality numbers for others of the plurality of regions of the digital image.

18. The non-transitory computer-readable storage medium of claim 17, wherein the method further comprises:
    for each given region of the plurality of regions of the digital image:
        mapping the luminance quality number for the given region to a target bit rate for the luminance channel for the given region that is a fraction of the length of the portion of the luminance bit stream that corresponds to the given region of the digital image;
        mapping the chrominance quality number for the given region to a target bit rate for the chrominance channels for the given region that is a fraction of the length of the portion of the chrominance bit stream that corresponds to the given region of the digital image; and
        supplying both the target bit rate for the luminance channel for the given region and the target bit rate for the chrominance channels for the given region to the rate distortion optimizer, which performs a rate-distortion optimization separately on the luminance channel and the chrominance channels corresponding to the given region to:
            determine which parts of the luminance bit stream corresponding to the given region to include in compressing the parts of the luminance bit stream corresponding to the given region into a rate-distortion optimized luminance bit stream for the given region whose length does not exceed the target bit rate for the luminance channel for the given region; and
            determine which parts of the chrominance bit stream corresponding to the given region to include in compressing the parts of the chrominance bit stream corresponding to the given region into a rate-distortion optimized chrominance bit stream for the given region whose length does not exceed the target bit rate for the chrominance channels for the given region.

19. A computer for compressing a digital image, comprising:
    a storage device storing code executable by the computer to:
        obtain the digital image in a de-correlated color space comprising separate channels, including a luminance channel and chrominance channels;

compress the digital image into a bit stream, wherein the bit stream comprises:
a compression of the luminance channel into a luminance bit stream; and
a compression of the chrominance channels into a chrominance bit stream;
map a received quality number for the luminance channel to a target bit rate for the luminance channel that is a fraction of the length of the luminance bit stream;
map a received quality number for the chrominance channels to a target bit rate for the chrominance channels that is a fraction of the length of the chrominance bit stream; and
supply both the target bit rate for the luminance channel and the target bit rate for the chrominance channels to a rate distortion optimizer which performs a rate-distortion optimization separately on the luminance and chrominance channels of the bit stream to determine which portions of the luminance bit stream to include in compressing the luminance bit stream into a rate-distortion optimized luminance bit stream whose length does not exceed the target bit rate for the luminance channel and which portions of the chrominance bit stream to include in compressing the chrominance bit stream into a rate-distortion optimized chrominance bit stream whose length does not exceed the target bit rate for the chrominance channels.

* * * * *